(12) United States Patent
Li et al.

(10) Patent No.: US 10,821,467 B2
(45) Date of Patent: Nov. 3, 2020

(54) ALIGNMENT FILM COATING MACHINE AND A COATING METHOD

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Xiang Li, Guangdong (CN); Chung-ching Hsieh, Guangdong (CN); Yongchao Zhao, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 343 days.

(21) Appl. No.: 15/748,453

(22) PCT Filed: Dec. 26, 2017

(86) PCT No.: PCT/CN2017/118632
§ 371 (c)(1),
(2) Date: Jan. 29, 2018

(87) PCT Pub. No.: WO2019/095509
PCT Pub. Date: May 23, 2019

(65) Prior Publication Data
US 2020/0122186 A1 Apr. 23, 2020

(30) Foreign Application Priority Data
Nov. 15, 2017 (CN) .......................... 2017 1 1129584

(51) Int. Cl.
B05C 11/06 (2006.01)
B05C 5/02 (2006.01)
G02F 1/1337 (2006.01)

(52) U.S. Cl.
CPC ............ *B05C 11/06* (2013.01); *B05C 5/0291* (2013.01); *G02F 1/133723* (2013.01)

(58) Field of Classification Search
CPC ....... B05C 5/0291; B05C 11/06; B05C 11/02; G02F 1/133723
See application file for complete search history.

(56) References Cited

U.S. PATENT DOCUMENTS

2004/0174469 A1* 9/2004 Takagi .................. G02F 1/1333
349/57
2008/0220167 A1* 9/2008 Wisniewski ............. B05D 1/40
427/256

(Continued)

FOREIGN PATENT DOCUMENTS

CN 103552377 2/2014
CN 103552377 A * 2/2014
CN 206039080 U 3/2017

*Primary Examiner* — Cachet I Proctor
(74) *Attorney, Agent, or Firm* — Hemisphere Law, PLLC; Zhigang Ma

(57) ABSTRACT

An alignment film coating machine and a coating method are provided. The alignment film coating machine includes an equipment for carrying a substrate, a spray head for spraying PI droplets, and an air knife disposed on the equipment and located on one side of the spray head. The air knife is used for moving along the equipment and blowing uniform impact air curtain to the PI droplets after the spray head sprays the PI droplets on the substrate. By adding the air knife into the alignment film coating machine, the diffusion ability of the PI droplets is improved due to the uniform impact air curtain blown by the air knife. The resistance in diffusion is overcome. The PI droplets enter the (Continued)

via hole. Mura, which is induced by a relatively thicker PI film around the via hole as a result of the accumulation of the PI droplets, is prevented.

6 Claims, 3 Drawing Sheets

(56) References Cited

U.S. PATENT DOCUMENTS

2009/0286340 A1* 11/2009 Kaneko ............... G02F 1/13363
  438/30
2018/0061669 A1* 3/2018 Liao .................... H01L 21/4857

* cited by examiner

| Setting an air knife on an equipment. The air knife is located on one side of a spray head. |

↓

| Using the spray head to spray PI droplets on a substrate carried on the equipment. |

↓

| Controlling the air knife to move along the equipment and blow a uniform impact air curtain to the PI droplets such that the PI droplets are diffused to form an alignment film. |

ALIGNMENT FILM COATING MACHINE AND A COATING METHOD

RELATED APPLICATIONS

The present application is a National Phase of International Application No. PCT/CN2017/118632, filed on Dec. 26, 2017, and claims the priority of China Application No. 201711129584.2, filed on Nov. 15, 2017.

FIELD OF THE DISCLOSURE

The disclosure relates to a technical field of screen display, and more particularly to an alignment film coating machine and a coating method.

BACKGROUND

The existing thin film transistor-liquid crystal display (TFT-LCD) Cell alignment film process is generally divided into an alignment film pre-cleaning process, an alignment film coating process, an alignment film pre-baking process, and an alignment film baking process. However, the current alignment film coating process is generally performed by using a PI (polyimide) inkjet method. The coating principle is shown in FIG. 1. The PI (polyimide) solution is sprayed through the small holes of the spray head 2'. High-density PI droplets B' are formed by using the movement of the spray head 2' or the equipment. At the end, the PI droplets are diffused on the substrate A' and connected to form an alignment film.

As the via hole of the TFT becomes larger and the via hole becomes deeper (such as COA (color filter on array)+PFA (polymer film on array)), Mura tends to appear after the PI coating process. Referring to FIG. 2, under the optical microscope, it is obvious that the color of a region around the via hole of the TFT is inconsistent with that of other regions. It has been found through research that when the PI solution diffuses to a deeper via hole, due to the greater resistance, the PI solution does not have sufficient diffusion energy. As a result, there is no PI solution in the via hole. The PI solution accumulates around the via hole such that the PI film around the via hole is relatively thicker and then the problem of Mura is induced. In order to solve the problem of Mura, the current common methods include redesigning the reticle to reduce the slope and perimeter of the hole, or improving the apparatus to use a small spray head to spray small droplets, etc. However, with the deepening of the via hole (such as adding one more layer of PFA), there is still a certain risk of using a single approach to solve the problem of Mura in a new and more complicated TFT structure. Accordingly, it is necessary to find a new, simple and economical method to solve the problem of Mura.

SUMMARY

A technical problem to be solved by the disclosure is to provide an alignment film coating machine and a coating method so as to enhance the diffusion ability of the PI droplets and solve the problem of Mura.

In order to solve the above technical problem, the disclosure provides an alignment film coating machine, comprising:
an equipment for carrying a substrate;
a spray head for spraying PI droplets;
an air knife disposed on the equipment and located on a side of the spray head, wherein the air knife is used for moving along the equipment and blowing a uniform impact air curtain to the PI droplets after the spray head sprays the PI droplets on the substrate.

Wherein a first angle is formed between the air knife and a horizontal plane of the equipment. The first angle is in a range from 20° to 40°.

Wherein a second angle is formed between a projection of the air knife on the equipment and a long side or a short side of the equipment. The second angle is 45°.

Wherein the air knife comprises a first air knife and a second air knife, symmetrically disposed on the equipment and located on the side of the spray head.

Wherein the spray head is disposed to be parallel to a short side of the equipment.

The disclosure further provides a coating method of an alignment film, comprising:
setting an air knife on an equipment, wherein the air knife is located on a side of a spray head;
using the spray head to spray PI droplets on a substrate carried on the equipment;
controlling the air knife to move along the equipment and blow a uniform impact air curtain to the PI droplets such that the PI droplets are diffused to form the alignment film.

Wherein the setting of the air knife on the equipment specifically comprises:
forming a first angle between the air knife and a horizontal plane of the equipment. The first angle is in a range from 20° to 40°.

Wherein the setting of the air knife on the equipment specifically comprises:
forming a second angle between a projection of the air knife on the equipment and a long side or a short side of the equipment. The second angle is 45°.

Wherein the air knife comprises a first air knife and a second air knife, symmetrically disposed on the equipment and located on the side of the spray head.

Wherein the spray head is disposed to be parallel to a short side of the equipment.

The beneficial effects of the embodiments of the disclosure comprise adding the air knife into the alignment film coating machine so as to use the air knife to blow a uniform impact air curtain after the PI droplets are coated such that the diffusion ability of the PI droplets is improved. As a result, the resistance in diffusion can be overcome, and the PI droplets enter the via hole. Therefore, the problem of Mura, which is induced by a relatively thicker PI film around the via hole as a result of the accumulation of the PI droplets around the via hole, is prevented.

BRIEF DESCRIPTION OF THE DRAWINGS

In order to more clearly illustrate embodiments of the disclosure or technical solutions in the prior art, the accompanying drawings, which are used in the description of the embodiments or the prior art, will be briefly described. Apparently, the accompanying drawings in the description below are merely some embodiments of the disclosure. Other drawings can be obtained by a person of ordinary skill in the art according to these drawings without creative efforts.

DETAILED DESCRIPTION OF PREFERRED EMBODIMENTS

The following description of various embodiments is made with reference to the accompanying drawings to illustrate specific embodiments that the disclosure can be practiced.

Figure 1:
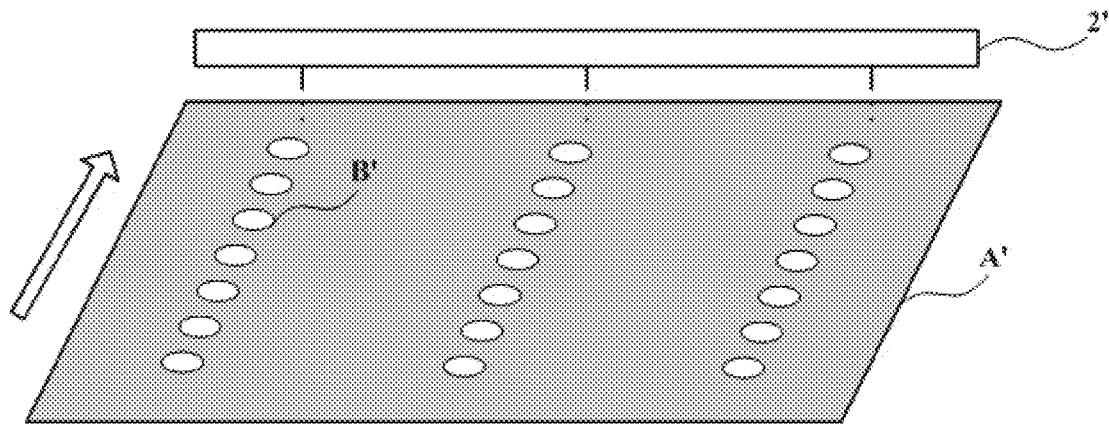
FIG. 1 is a schematic view of the principle of the existing alignment film coating method.
Figure 2:
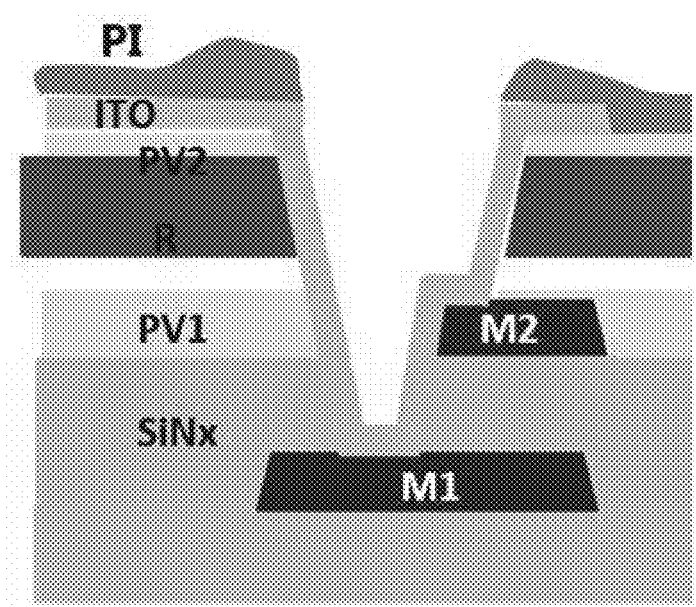
FIG. 2 is a schematic view of the accumulation of the PI droplets around the via hole caused by the existing alignment film coating method.
Figure 3:
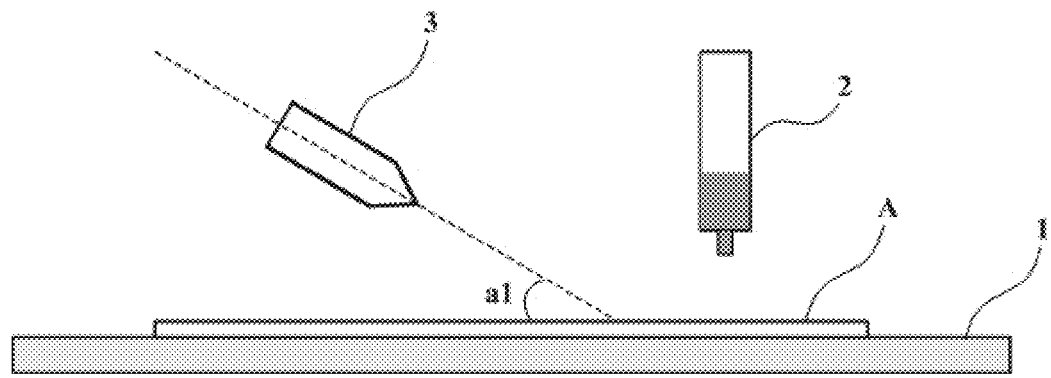
FIG. 3 is a structural schematic side view of an alignment film coating machine according to a first embodiment of the disclosure.

Referring to FIG. 3, a first embodiment of the disclosure provides an alignment film coating machine, comprising:

an equipment 1 for carrying a substrate A;

a spray head 2 for spraying PI droplets;

an air knife 3 disposed on the equipment 1 and located on one side of the spray head 2. The air knife 3 is used for moving along the equipment 1 and blowing a uniform impact air curtain to the PI droplets after the spray head 2 sprays the PI droplets on the substrate A.

It should be noted that the air knife is generally used in the industrial field to blow a large amount of air so as to remove water and dust. On the other hand, in the embodiment of the disclosure, a uniform impact air curtain blown by the air knife is used to increase the diffusion motion of the PI droplets. As a result, the PI droplets can overcome the resistance in diffusion, especially the color resistance and the resistance of the via hole of the PFA.

In the embodiment, the air knife 3 is disposed on the equipment 1 of the alignment film coating machine and located on one side of the spray head 2. The air knife 3 is positioned in front of or behind the spray head 2 as viewed in the moving direction. (As shown in FIG. 3, if the moving direction is the right side, the air knife 3 is positioned behind the spray head 2; if the moving direction is the left side, the air knife 3 is positioned in front of the spray head 2.) The movement of the air knife 3 is controlled by the gantry at the same time as the spray head 2. The air knife 3 and the spray head 2 can move along the equipment 1 together.

In order to make the PI droplets more easily diffused due to the impact air curtain blown by the air knife 3, there should be a specific angle a1 between the air knife 3 and the horizontal plane of the equipment 1, as shown in FIG. 3. In the embodiment, the angle a1 is in a range from 20° to 40°.

Figure 4:
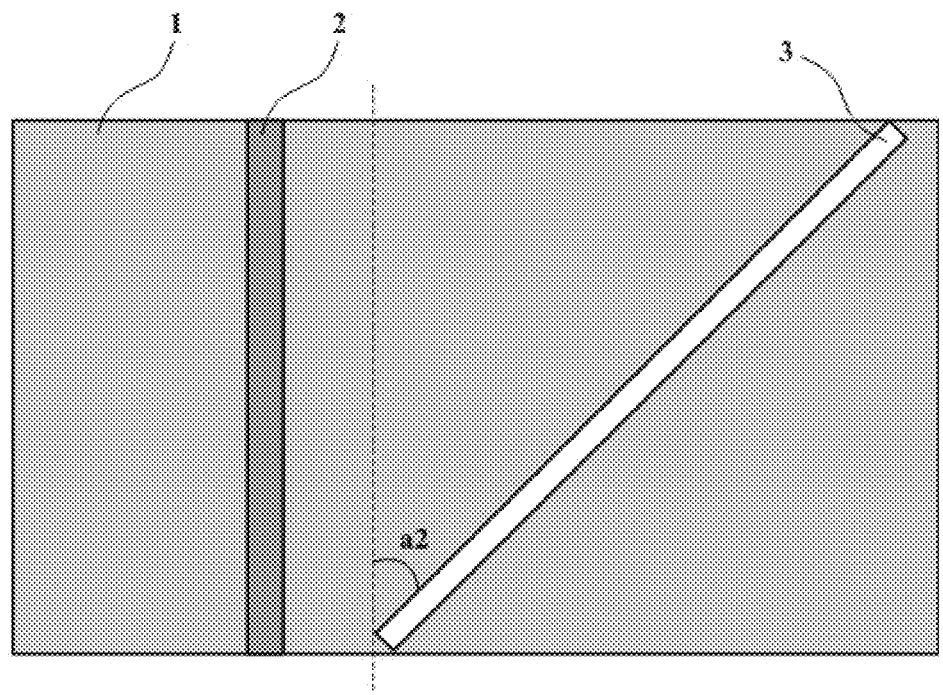
FIG. 4 is a structural schematic top view of an alignment film coating machine according to a first embodiment of the disclosure.

Similarly, as shown in FIG. 4, the air knife 3 can blow in both the horizontal and vertical directions so that the PI droplets are simultaneously diffused to the long side and the short side of the substrate A. As a result, the PI droplets more easily cross the via hole in pixels. In order to achieve it, the air knife 3 is different from the spray head 2, which is parallel to the short side of the equipment 1. There is an angle a2 between the projection of the air knife 3 on the equipment 1 and the long side or the short side of the equipment 1. In the embodiment, the angle a2 is 45°.

In the embodiment, the air force of the air knife 3 is not limited, as long as the air blow amount is not too large to cause the PI droplets accumulate in one direction to form the PI Mura.

In the embodiment, two air knives can be used to blow the PI droplets on the substrate A. The two air knives blow in opposite directions. The impact air curtains between the two air knives can be ensured not interfere with each other.

Figures 5, 6:
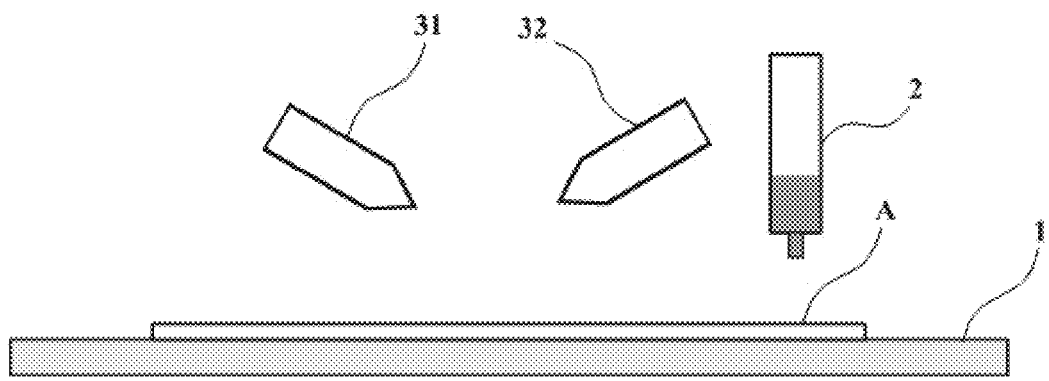
FIG. 5 is a structural schematic side view of an alignment film coating machine from another side according to a first embodiment of the disclosure.
FIG. 6 is a flowchart of a coating method of an alignment film according to a second embodiment of the disclosure.

As shown in FIG. 5, in the embodiment, there are two air knives, a first air knife 31 and a second air knife 32 symmetrically disposed on the equipment 1 and located on one side of the spray head 2.

The alignment film coating machine of the embodiment is mainly used in the fabrication of TFT-LCD cells. The air knife is not limited to a particular type of air knife, as long as an air knife capable of producing a uniform impact air curtain can be integrated into the alignment film coating machine.

Referring to FIG. 6 again, corresponding to the first embodiment of the disclosure, the second embodiment of the disclosure provides a coating method of an alignment film, comprising:

setting the air knife on the equipment, wherein the air knife is located on one side of the spray head;

using the spray head to spray the PI droplets on the substrate carried on the equipment;

controlling the air knife to move along the equipment and blow a uniform impact air curtain to the PI droplets such that the PI droplets are diffused to form the alignment film.

Compared with the existing coating method of the alignment film, in the embodiment, after the PI droplets are coated, an air knife process is newly added before the PI pre-baking process. The air knife is moved along the equipment and blows a uniform impact air curtain to the PI droplets such that the PI droplets are diffused to form the alignment film. The coating of the alignment film is completed.

Furthermore, the setting of the air knife on the equipment specifically comprises:

forming a first angle between the air knife and the horizontal plane of the equipment. The first angle is in a range from 20° to 40°.

Furthermore, the setting of the air knife on the equipment specifically comprises:

forming a second angle between the projection of the air knife on the equipment and the long side or the short side of the equipment. The second angle is 45°.

Furthermore, the air knife comprises a first air knife and a second air knife, symmetrically disposed on the equipment and located on one side of the spray head.

Furthermore, the spray head is disposed to be parallel to the short side of the equipment.

It can be understood from the above description that the beneficial effects of the embodiments of the disclosure comprise adding the air knife into the alignment film coating machine. The air knife is used to blow a uniform impact air curtain after the PI droplets are coated such that the diffusion ability of the PI droplets is improved. As a result, the resistance in diffusion can be overcome, and the PI droplets enter the via hole. Therefore, the problem of Mura, which is induced by a relatively thicker PI film around the via hole as a result of the accumulation of the PI droplets around the via hole, is prevented.

The foregoing descriptions are merely preferred embodiments of the disclosure. The protection scope of the disclosure is certainly not limited to these descriptions. Therefore, equivalent changes made according to the disclosure should be included in the protection scope of the application.

What is claimed is:

1. An alignment film coating machine, comprising:

an equipment for carrying a substrate with a via hole;

a spray head for spraying polyimide (PI) droplets on the substrate; and an air knife disposed on the equipment and located on a side of the spray head, wherein the air knife is used for moving along the equipment and blowing a uniform impact air curtain to the PI droplets after the spray head sprays the PI droplets on the substrate to make the PI droplets be diffused to enter the via hole and form an alignment film on the substrate;

wherein a first angle is formed between the air knife and a horizontal plane of the equipment, and wherein the first angle is in a range from 20° to 40°;

wherein a second angle is formed between a projection of the air knife on the equipment and a long side or a short side of the equipment, and wherein the second angle is 45°.

2. The alignment film coating machine as claimed in claim 1, wherein the air knife comprises a first air knife and a second air knife, symmetrically disposed on the equipment and located on the side of the spray head.

3. The alignment film coating machine as claimed in claim 1, wherein the spray head is disposed to be parallel to a short side of the equipment.

4. A coating method of an alignment film, comprising:
setting an air knife on an equipment, wherein the air knife is located on a side of a spray head;

using the spray head to spray polyimide (PI) droplets on a substrate with a via hole carried on the equipment; and controlling the air knife to move along the equipment and blow a uniform impact air curtain to the PI droplets such that the PI droplets are diffused to enter the via hole of the substrate and form the alignment film on the substrate;

wherein the setting of the air knife on the equipment comprises:
forming a first angle between the air knife and a horizontal plane of the equipment, wherein the first angle is in a range from 20° to 40°;

forming a second angle between a projection of the air knife on the equipment and a long side or a short side of the equipment, wherein the second angle is 45°.

5. The coating method of an alignment film as claimed in claim 4, wherein the air knife comprises a first air knife and a second air knife, symmetrically disposed on the equipment and located on the side of the spray head.

6. The coating method of an alignment film as claimed in claim 4, wherein the spray head is disposed to be parallel to a short side of the equipment.

* * * * *